(12) United States Patent
Rotter (10) Patent No.: US 10,881,116 B2
(45) Date of Patent: Jan. 5, 2021

(54) ULTRASOUND CLEANING METHOD WITH SUSPENDED NANOPARTICLES (71) Applicant: EVER CLEAN AND CLEAR TECHNOLOGIES LTD, HaBonim (IL)

(72) Inventor: Shlomo Rotter, Rehovot (IL)

(73) Assignee: EVER CLEAN AND CLEAR TECHNOLOGIES LTD, Habonim (IL)

( * ) Notice: Subject to any disclaimer, the term of this patent is extended or adjusted under 35 U.S.C. 154(b) by 0 days.

(21) Appl. No.: 16/105,055

(22) Filed: Aug. 20, 2018

(65) Prior Publication Data

US 2019/0000098 A1    Jan. 3, 2019

Related U.S. Application Data

(63) Continuation of application No. 15/304,381, filed as application No. PCT/IL2015/050396 on Apr. 13, 2015, now Pat. No. 10,080,370.

(60) Provisional application No. 61/979,136, filed on Apr. 14, 2014.

(51) Int. Cl.
| | | |
|---|---|---|
| *A23L 3/30* | (2006.01) | |
| *A23B 7/015* | (2006.01) | |
| *A23N 12/02* | (2006.01) | |
| *B08B 3/12* | (2006.01) | |

(52) U.S. Cl.
CPC ............... *A23B 7/015* (2013.01); *A23L 3/30* (2013.01); *A23N 12/02* (2013.01); *B08B 3/12* (2013.01); *A23V 2002/00* (2013.01)

(58) Field of Classification Search
CPC .. B08B 3/00; B08B 3/12; A23B 7/015; A23L 3/30; A23N 12/02; A23V 2002/00
See application file for complete search history.

(56) References Cited

U.S. PATENT DOCUMENTS

| | | | |
|---|---|---|---|
| 671,922 A | 4/1901 | Peterson | |
| 3,695,934 A | 10/1972 | Feldhaus | B03C 1/24 134/1 |
| 4,631,072 A | 12/1986 | Koller | A61L 12/124 51/308 |

(Continued)

FOREIGN PATENT DOCUMENTS

| | | |
|---|---|---|
| CA | 2107238 | 3/1991 |
| CN | 102076435 A | 5/2011 |

(Continued)

OTHER PUBLICATIONS

Additives in Polymers, Industrial Analysis and Applications by Jan C.J. Bart, John Wiley & Sons Incorporated, pp. 75-77. (Year: 2005).

(Continued)

*Primary Examiner* — Sharidan Carrillo
(74) *Attorney, Agent, or Firm* — Browdy and Neimark, PLLC (57) ABSTRACT

A method for reducing level of contaminants from an object, the method comprises introducing the object into an ultrasonic (US) bath carrying an aqueous medium that holds, suspended therein, insoluble nanoparticles and activating said bath to apply US waves only said object while the object is at least partially submerged within said aqueous medium.

15 Claims, 3 Drawing Sheets

(56) References Cited

U.S. PATENT DOCUMENTS

| | | | | |
|---|---|---|---|---|
| 5,198,122 | A | 3/1993 | Koszalka | A62D 3/13 |
| | | | | 134/1 |
| 5,219,769 | A | 6/1993 | Yonehara | H01L 29/1602 |
| | | | | 117/913 |
| 6,790,409 | B1 | 9/2004 | Nakamura | A61L 12/06 |
| | | | | 422/22 |
| 9,974,753 | B2 * | 5/2018 | Salman | A61K 9/006 |
| 10,080,370 | B2 * | 9/2018 | Rotter | A23B 7/015 |
| 2002/0185150 | A1 * | 12/2002 | Namerikawa | B08B 3/12 |
| | | | | 134/1 |
| 2003/0115794 | A1 | 6/2003 | Kubota | |
| 2012/0240956 | A1 | 9/2012 | Nishimoto | B08B 3/12 |
| | | | | 134/1 |

FOREIGN PATENT DOCUMENTS

| | | | |
|---|---|---|---|
| JP | H09299893 | A | 11/1997 |
| WO | 92/16116 | A1 | 10/1992 |
| WO | 2006/001293 | A1 | 1/2006 |
| WO | 2006/106045 | A1 | 10/2006 |
| WO | WO2006106045 | | 10/2006 |

OTHER PUBLICATIONS

Jan C.J. Bart, Additives in Polymers: Industrial Analysis and Applications, Wiley 2005, pp. 75-77.
Mohs scale of mineral hardness—Wikipedia, pp. 1-9, Aug. 26, 2017.

* cited by examiner

ULTRASOUND CLEANING METHOD WITH SUSPENDED NANOPARTICLES

TECHNOLOGICAL FIELD

The present invention concerns the use of ultrasound techniques for treatment of objects and in particular ultrasound based methods for removing contaminants from various objects and products.

PRIOR ART

References considered to be relevant as background to the presently disclosed subject matter are listed below:
Jan C. J. Bart, Additives in Polymers: Industrial Analysis and Applications, Wiley 2005, pg. 76
WO06/001293
US2003115794

Acknowledgement of the above references herein is not to be inferred as meaning that these are in any way relevant to the patentability of the presently disclosed subject matter.

BACKGROUND

Ultrasonic systems are used for various purposes. For example, Bart Jan C. J. describe the utilization of ultrasonic systems for cleaning surgical instruments, by the effect of the implosion of bubbles created during sonication [Jan C. J. Bart, Additives in Polymers: Industrial Analysis and Applications, Wiley 2005, pg. 76].

International Patent Application No. WO06/001293 describes an ultrasonic cleaning method and device for sterilizing medical appliances and for washing hands in the purpose of disinfection in a sterilizing fluid. The ultrasonic cleaning device is structured to perform discharged ozone sterilization and silver electrolytic sterilization by silver ions on the object to be sterilized in the sterilizing fluid.

Finally, US2003115794 describes a method for treating seeds with a solution containing at least one agent selected from the group consisting of a cationic surfactant, an amphoteric surfactant, a biguanide compound, an iodine compound, and an alcoholic compound, with the aim of improving the ultrasonic cleaning effect of seeds infected with plant pathogens and acceleration of germination rate of the seeds.

GENERAL DESCRIPTION

The present disclosure is based on the finding that when operating commercially available ultrasonic baths having in the liquid medium nano-sized particles, the cleaning effect obtained by the ultrasonic is unexpectedly better as compared to that obtained when operated without the particles. This was found to be effective on various different objects, of various characteristics.

Thus, the present disclosure provides, in accordance with its broadest aspect, method for reducing level of contaminants from an object, the method comprises introducing said object into an ultrasonic (US) bath carrying an aqueous medium holding suspended therein insoluble nanoparticles and activating said bath to apply US waves onto said object while the plant part is at least partially submerged within said aqueous medium.

Further provided by the present disclosure is a method for reducing level of contaminants from a plant part, the method comprises introducing said plant part into an ultrasonic (US) bath carrying an aqueous medium holding suspended therein insoluble nanoparticles and activating said bath to apply US waves onto said plant part while the plant part is at least partially submerged within said aqueous medium.

In some examples, there is also provided by the present disclosure, an object, in particular, a plant part, comprising a maximum residue level (MRL) of less than 20% from the MRL acceptable for the harvested crop under Regulation 396/2005, the harvested crop being obtained by the method described above.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

EMBODIMENTS OF THE INVENTION

The present disclosure aims at "cleaning" objects, without causing damage, disintegration or accelerated deterioration of the object per se, as compared the condition of the object without applying said method.

In the context of the present disclosure, cleaning is to be understood as any action of removing undesired substance from at least the surface of the object. The cleaning includes, without being limited thereto, disinfecting, polishing, washing off, etc. In some examples, the method disclosed herein can also result in an effect of reducing roughness or smoothing at least the surface of the object being treated. The undesired contaminants may be adhered, embedded or otherwise associated with the object.

The general principle of the present disclosure is the combination of US waves with nanoparticles to achieve the "cleaning" effect.

Conventional ultrasonic baths use cavitation bubbles induced by high frequency sound waves to activate the liquid within the bath/chamber. This cavitation activation produces high forces, by implosion via powerful micro size liquid jets on surfaces of the treated objects, such as metals, plastics, glass, rubber, and ceramics that result in the removal of solid matter or contaminations adhered to the surface or within the object to be treated, or otherwise associated with the object to be treated.

In some aspects, the present disclosure is based on the finding that applying on an object the effect of the cavitation bubbles, in the presence of insoluble hard nanoparticles, had a better effect on cleaning the surface of the object compared to treatment of the same object by ultrasound alone, or by immersing the object in a disinfecting solution. Without being bound by theory, it is believed that the micro-jets of liquid carry the nanoparticles as hard projectiles that blast the surface with "bullets" compared to pure liquid in the ultrasound cleaning without nanoparticles. This treatment of the object is carried out by means of fluid phase nano-blasting action that removes material more efficiently than pure liquid ultrasound cleaning, or by immersing the object in a treating solution.

This improved effect was exhibited on various types of objects, with different surface characteristics, from plants or plant parts such as seeds, fruits and vegetables (such as tomatoes), to metal surfaces such as aluminum foil sheets and stainless steel candle holders.

Thus, the present disclosure provides, in its broadest aspect, a method for reducing level of contaminants from an object, the method comprises introducing said object into an ultrasonic (US) bath carrying an aqueous medium holding suspended therein insoluble nanoparticles and activating said bath to cause the formation of US waves within the bath while the object is at least partially submerged within said aqueous medium. The US waves cause the movement of the nanoparticles in the bath which in turn appear to act as "scrubbers".

In the context of the present disclosure the "object" is any solid object that does not disintegrate in a liquid medium and/or under ultrasonic vibration. The object may be of any matter.

In some other examples, the object is organic in essence. In some examples, the organic object is a plant part.

In some examples, the "contaminant" can be any one or combination of dirt, grease, oil, pigments, rust, algae, pathogen, fungus, bacteria, virus, lime scale, chemical compounds (e.g. biocides), flux agents, fingerprints, soot wax, mold release agents, soil, or any other matter associated or adhered to the object and the removal of which is desired.

In some examples, the object can be defined as a solid object having a Young modulus within a defined range. As appreciated, the young modulus defines an object's tendency to be deformed elastically (i.e. not permanently) when the force is applied to it. An object whose Young's modulus is very high (e.g. above 10 psi) is regarded as a rigid object, and an object whose young's modulus is low (e.g. below $10^5$ psi) is regarded as soft. Thus, in some examples, the object is inorganic in essence. In some examples, the inorganic object comprises a metal or a metal alloy. For example, metals such as gold, aluminum and silver, are known to have a Young's modulus of $10.8 \times 10^6$ psi, $10.0 \times 10$ psi and $10.5 \times 10^6$ psi, respectively. Some metals are known to have an even higher Young's modulus of $59.5 \times 10^6$ psi, such as tungsten.

At times, when the object is a harvested crop, such as a fruit or a vegetable, the Young's modulus is approximately similar to that of rubber, namely, 1450 psi to 14,500 psi.

In the context of the present disclosure the term "plant part" denotes any organic plant part. The plant part may be fresh (i.e. immediately after picking or harvesting) or preserved (i.e. some time after picking or harvesting and being maintained under suitable storage conditions). The plant part may be a whole plant including roots, stem, leaves etc., extracted from the soil or other medium required for its development. In some embodiments, the plant part is a part of the plant per se.

In one example, the plant part includes at least the harvested crop, e.g. fruit, fruit body (sporocarp) or vegetable.

In one other example, the plant part includes at least the leaves.

In some other example, the plant part includes at least the seeds.

The plant may be of any kind from which a part thereof may be of interest, e.g. as a commercial commodity, for industry (e.g. cosmetics, pharmaceutical), for research, etc.

In some examples, the plant is any member of the group consisting of spinach seeds, corn salad seeds, carrot, watermelon, melon, tomato, lettuce, cabbage, onion, cucumber, sweet pepper, hot pepper, squash, eggplant, pumpkin, radish, celeriac, fennel, basil, chive, coriander, dill, parsley, sugar Beet and *cannabis*.

In one example, the plant is spinach, and the plant part is the spinach leaves and/or spinach seeds.

In one example, the plant is corn, and the plant part is the corn seeds.

In one example, the plant is carrot, and the plant part is the carrot root and/or carrot seeds.

In one example, the plant is watermelon, and the plant part is the watermelon fruit and/or watermelon seeds.

In one example, the plant is melon, and the plant part is the melon fruit and/or melon seeds.

In one example, the plant is tomato, and the plant part is the tomato vegetable and/or tomato seeds.

In one example, the plant is lettuce, and the plant part is the lettuce's leaf vegetable and/or lettuce seeds.

In one example, the plant is cabbage, and the plant part is the leaf fruit thereof and/or cabbage seeds.

In one example, the plant is onion, and the plant part is the onion bulb.

In one example, the plant is cucumber, and the plant part is the cucumber vegetable and/or cucumber seeds.

In one example, the plant is sweet pepper, and the plant part is the sweet pepper vegetable and/or its seeds.

In one example, the plant is hot pepper, and the plant part is the hot pepper vegetable and/or its seeds.

In one example, the plant is squash, and the plant part is the squash vegetable and/or squash seeds.

In one example, the plant is eggplant, and the plant part is the eggplant vegetable and/or eggplant seeds.

In one example, the plant is pumpkin, and the plant part is the pumpkin fruit and/or pumpkin seeds.

In one example, the plant is radish, and the plant part is the radish root vegetable and/or radish leaves.

In one example, the plant is celeriac, and the plant part is the root vegetable and/or celery leaves.

In one example, the plant is fennel, and the plant part is the bulb and/or the leaves.

In one example, the plant is basil, and the plant part is the basil leaves and/or its seeds.

In one example, the plant is chive, and the plant part is the chive leaves and/or its seeds.

In one example, the plant is coriander, and the plant part is the coriander leaves and/or its seeds.

In one example, the plant is dill, and the plant part is the dill leaves and/or its seeds.

In one example, the plant is parsley, and the plant part is the parsley leaves and/or its seeds.

In one example, the plant is sugar beet, and the plant part is the root and/or its leaves and/or sugar beet seeds.

In one example, the plant is *cannabis*, and the plant part is the *cannabis* leaves and/or *cannabis* seeds.

In some examples, the plant part is the harvested crop. In this context, the harvested crop may be any part of the plant that is of commercial and/or industrial value, that is consumable by a leaving being (human as well as animal) etc.

When the plant part comprises a fruit, the plant may be any one of apple, banana, grape, strawberry, corn, rice, nut, pear, berry, plum, apricot, olive, cherry, peach, pineapple, kiwi, pomegranate, tomato, plum, eggplant. In some examples, the plant is selected from the Citrus fruit family, such as, without being limited thereto, lemon, lime, grapefruit, tangerine, mandarin, pomelo and orange.

When the plant part comprises a vegetable, the plant may be any one of cucumber, squash, zucchini, herbs, rhubarb, carrot, radish, bean, pepper and pea.

In some other examples, the plant part comprises the plant's leaves.

In yet some other examples, the plant part includes the plant seeds.

In some examples, the plant part includes different parts of the plant, e.g. the bulb with the leaves attached thereto.

The object, e.g. the plant part, is introduced into the ultrasonic (US) bath for the purpose of its cleaning from contaminations. When referring to cleaning, in the context of the present invention it is to be understood as any level of removing contaminants from at least the surface of the object, but not only from the surface thereof.

Depending on the object to be treated, the contaminants may vary as well as the manner of performing the method disclosed herein. However, generally, and in accordance with its broad aspect, the method comprises activating the US bath for a time sufficient to reduce level of contaminants from the object as compared to the level thereof before the application of the US waves on the object. The level of contaminants may be determined by any method known in the art and dependents on the expected contaminant on the object to be treated, as further discussed below.

In some examples, the method disclosed herein permits to reduce the level of contaminants by at least 50% as compared to the level thereof before said application of the US waves. In some examples, the level of contaminants is reduced by at least 60%, at times, by at least 70%, or even, at times, by at least 80%, or 90% or even 95% or 99% as compared to the level of the same contaminant(s) before performing US bath treatment.

In some examples, the level of contaminants is determined as compared to maximum residual level (MRL) standards as further discussed below.

In some other examples, the level of contaminants is determined by the level of roughness of the object's surface (irregularities in the texture, with the assumption that the contaminants are adhered to the surface of the object and thus contribute to its surface roughness). Roughness or the change in roughness as a result of performing the method disclosed herein can be determined by surface roughness average (Ra) units. Roughness is typically quantified by the vertical deviations of a real surface from its ideal form. If these deviations are large, the surface is rough; if they are small the surface is smooth.

As noted herein, the nano-sized particles are an essential feature of the method disclosed herein. Without the nano-sized particles the cleaning effect of the US bath is either not apparent or is at a much lower extent as compared to that obtained with the particles.

To the aqueous medium the water insoluble nanoparticles are added. In the context of the present disclosure, the water insoluble nanoparticles are to be understood as discrete nanoscopic particles, having at least one dimension in the nanometer scale and that they do not dissolve in water.

In some examples, the nanoparticles are chemically inert particles. In the context disclosed herein it is to be understood that a "chemically inert" particle is one that does not react or participate in a chemical reaction and its only function or effect is with the cleaning of the object within the bath. i.e. the removal of the contaminants from the object. The particles, being nano-sized, have an average diameter within the range of 1 nm to 1.000 nm. In some examples, the particles have an average diameter in the range of 2 nm to 500 nm. In some examples, the particles have an average diameter in the range of 10 nm to 100 nm. In some examples, the particles have an average diameter in the range of 30 nm to 80 nm. In some examples, the particles have an average range of a bout 50 nm±10 nm.

In some examples, the water insoluble particles are of diamond powder.

In some examples, the water insoluble particles are metal oxide nanoparticles. Non-limiting examples of metal oxide nanoparticles include ant member selected from the group consisting of aluminum oxide nanoparticles, zirconium oxide nanoparticles, titanium oxide nanoparticles, cerium oxide nanoparticles and mixtures thereof.

In some examples, the water insoluble particles are transition metal carbide nanoparticles. Non-limiting examples of a transition metal carbide is any member elected from the group consisting of silicon carbide, titanium carbide, calcium carbide, tungsten carbide and mixtures thereof.

In some examples, the water insoluble particles are silicon oxide nanoparticles.

In some examples, the water insoluble particles are aluminum oxide nanoparticles.

In some examples, the water insoluble particles are metal nitride nanoparticles. Non-limiting examples are selected from the group consisting of gallium nitride, aluminum nitride, indium nitride and mixtures thereof.

In some examples, the water insoluble particles are any mixture of the above.

In one preferred examples, the nanoparticles comprises diamond powder.

Irrespective of the matter from which they are formed, the nanoparticles can be characterized their hardness (i.e. the property of a material that enables it to resist plastic deformation (usually by penetration) and/or its resistance to bending, scratching, abrasion or cutting). In some examples, the nanoparticles are characterized by hardness in the range of 7 to 11 according to Mohs scale (typically used in mineralogy). In yet some additional or alternative examples, the particles are characterized by hardness in the range of 700 to 1100 according to Vickers scale.

The method disclosed herein can use different amounts (concentrations) of the nanoparticles. In some examples, the nanoparticles in the US bath are at a concentration of between 0.0001% w/v to 1.0% w/v.

In some examples, the nanoparticles in the US bath are at a concentration of between 0.0001% w/v to 0.1% w/v.

In some examples, the nanoparticles in the US bath are at a concentration of between 0.001% w/v to 0.05% w/v.

In some examples the nanoparticles in the US bath are at a concentration of at least 0.0001% w/v, at times, 0.001% w/v, at times, 0.005% w/v, at times, 0.01% w/v, and further at times, 0.1% w/v.

In some examples, the nanoparticles in the US bath are at a concentration of at most 1% w/v, at times, at most 0.5% w/v, at times, at most 0.1% w/v; at times, at most 0.05% w/v; further at times, at most 0.01% w/v.

Optimization of particles density/amount may be achieved by determined by the amount of absorption of the ultrasound by the nanoparticles. Without being bound by theory, it is assumed that high density of nanoparticles results in less treatment (cleaning/smoothening etc) efficiency, as some of the treatment power is lost, due to absorption by the solid nanoparticles.

When placing the object in the chamber of the cleaning bath the object is preferably not allowed to rest on the bottom of the bath during the treatment process, because that prevents cavitation from taking place on the part of the object resting on the bottom of the bath (i.e. not in contact with water). Therefore, when placing the object in the cleaning chamber it is to be understood as providing contact between the aqueous medium and the surface which needs to be treated. In some embodiments, at least 80% of the object's surface is in contact with the medium, at times, at least 90% and further at times, about 100% coverage of the surface with the aqueous medium. i.e. that the object is fully submerged in the medium and hanged within the chamber of the ultrasonic bath that holds the medium.

Due to the manner of operation of the ultrasonic cleaner, upon activation of the ultrasonic bath the nanoparticles are dispersed within the aqueous medium. The combined action of the cavitation bubbles and the high energy movement of the nanoparticles within the medium (due to the forces caused by the cavitation bubbles imploding on the surface of the object to be treated) lead to the "cleaning" or "smoothening" of the object's surface.

The aqueous medium may be any medium conventionally used in ultrasonic cleaning techniques. In some embodiments, the aqueous medium is water or water based medium. The water based medium may comprise any component that may assist in the cleaning action, this includes, without being limited thereto, detergents, wetting agents (surfactants, such as laundry detergent) and other components, and have an influence on the cleaning process. There are various detergents and wetting agents known to be used with ultrasonic cleaning.

The aqueous medium may, in some embodiments, comprise one or more disinfecting agents. The disinfecting agent may be any one known in the art, such as, without being limited thereto, chloride based agents and Disodium Phosphate Anhydrous (DSP). These disinfecting agents may be used to disinfect (eradicate) any microorganism developed on the surface of the object.

In some embodiments, the disinfecting agent is an oxidizing agent. Oxidizing agents are known in the art and without being limited thereto, may include silver nanoparticles that release silver atoms that initiate oxidants.

The US bath is operated under conditions where the object is at least partially submerged in the liquid medium within the bath. In the context disclosed herein it is to be understood that the object does not need to be in its entirety submerged in the liquid of the bath. In some examples, at least the part that requires the cleaning effect is submerged during at least part of the operation of the US waves. This can be achieved by allowing the object to roll or otherwise turn over within the bath such that during the operation of the US bath the entire surface of the object is exposed to the US waves and the nanoparticles.

The US bath is activated either before introducing the object into the bath or after said introducing.

In some examples, the bath is activated at a frequency range of between 20 kHz to 1.500 kHz. In some examples, the activating of the ultrasonic bath is at a frequency range of between 20 kHz to 150 kHz, at times, between 40 kHz to 90 kHz.

In some examples, the bath is activated at a frequency of at least 10 kHz, at times, at a frequency of at least 20 kHz, at times, of at least 30 kHz, at times, of at least 40 kHz.

In some examples, the bath is activated at a frequency of at most 1.500 kHz, at times, at a frequency of at most 1,000 kHz, at times, at most, 900 kHz, at times, at most, 800 kHz at times, at most, 700 kHz at times, at most, 600 kHz at times, at most, 500 kHz at times, at most, 400 kHz at times, at most, 300 kHz, at times, at most, 200 kHz, at times, at most, 150 kHz, at times, at most, 100 kHz.

In some examples, the bath is activated at an acoustic powder density in the range of 6 W/liter to 1,500 W/liter. In some examples, the bath is activated at an acoustic powder density in the range of 15 W/liter to 150 W/liter. Yet, at times, the bath is activated at an acoustic powder density in the range of 4 W/liter to 65 W/liter, or at times, in the range of 10 Watt/liter to 120 Watt/liter.

The US can be operated for any length of time determined to be effective for removing contaminants from a particular object without causing significant damage to the object (i.e. damage that will cause the object to be of no or less value). This can be determined by preceding standardization tests for each object/contaminant or a group of objects and/or contaminants.

In general, and in accordance with some examples, treatment in accordance with the method disclosed herein requires operation of the US bath with the nano-sized particles for a time period from seconds to at least 10 minutes.

In some examples, the US is activated, i.e. the US waves are applied (with the particles) onto the object for a time period of at least 10 seconds, at times, 30 seconds, at times, 1 minute, at times, for at least 5, 6, 7, 8, 9, 10, 20, 30.40, 50 or even 60 minutes or any time period in between 1 to 60 minutes.

At times, the operating time of the ultrasonic bath is between 30 sec to 10 min, at times, between 20 see to 5 min, or between 1 sec to 10 min.

In some examples, the US waves are applied for a time period of no more than 120 minutes, at times, no more than 60 minutes, at times, no more than 30 minutes, at times, no more than 20 minutes, at times, no more than 10 minutes.

The temperature of the bath during its operation may vary, and will depend inter alia on the type of the object, e.g. whether or not the temperature may affect its quality post treatment, the type of contaminants, the level of contamination before treatment, the amount of nanoparticles, the type of nanoparticles, and the operational parameters of the bath (e.g. frequency, acoustic power density etc).

In some examples, the temperature of the aqueous medium in the bath is controlled to be maintained to be above 1° C., at times, above 10° C. at times, above 20° C., at times, above 30° C. and yet at times, above 40° C.

In some examples, the temperature of the aqueous medium in the bath is controlled to be maintained below 60° C. at times, below 50° C. yet at times, below 40° C. or even below 30° C.

In some examples, the temperature of the aqueous bath is essentially equal to the room temperature. This can be defined as any temperature within the range of 20° C.±5° C.

In some examples, the temperature of the aqueous medium in the bath is controlled to be in the range of 1° C. and 60° C.

The ultrasonic bath may be of any size and shape. In some embodiments, the ultrasonic bath is selected to carry a volume of aqueous medium in the range of 10 L to 15,000 L. As such, the method of the invention may be suitable for both small as well as large scale treatment of objects When the object is the plant part, the quality or performance of the method may be determined using maximum residual level (MRL) of the contaminants.

The effectiveness of the method disclosed herein on plant parts and in particular crops can be defined by the maximal residual level (maximal residue limit. MRL) of contaminants and in particular pesticides on the skin of the plant part after the treatment.

In some examples, the method provides plant part having a maximum residue level (MRL) of contaminants of less than 30% from the MRL acceptable for said plant part under Regulation 396/2005. At times, the method provides plant part having a maximum residue level (MRL) of contaminants of less than 20% from the MRL acceptable for said plant part under Regulation 396/2005. Further, at times, the method provides plant part having a maximum residue level (MRL) of contaminants of less than 10% from the MRL acceptable for said plant part under Regulation 396/2005.

In some examples, the contaminant is a pathogen.

The pathogen can be any agent that would cause damage to the object.

In some examples, the pathogen is or comprises fungi.

In some examples, the pathogen is or comprises a virus.

In yet some examples, the pathogen is or comprises bacteria.

When the object is a plant or plant part, the contaminant comprises at least one plant pathogen.

In some examples, the plant part comprises seeds and the pathogen is a seed pathogen. In yet some other examples, the pathogen is one associated with the fruit or vegetable and/or with the leaves (herb) of the plant.

At times, the contaminant can comprise in addition to the pathogen per se, or alternately at least one biocide, such as those used in agriculture. The biocide can be any one or combination of insecticide, pesticides and/or nematicides.

In this connection, and in particular when treated harvested crops, it is to appreciated that many agricultural crops carry on their outer skin deposited contaminants, such as biocidal (pesticidal) material, dust, dirt etc. Such contaminants are, at times, not easily removed by simple washing with water and it is desired to provide the consumer with the harvested crop clean of such contaminants. The method disclosed herein was found to be efficient in removing such contaminants and smoothening the surface of the harvested crops without damaging the outer skin of the crop and as such, without deteriorating the quality of the crop.

The ultrasound method disclosed herein was found effective in the removal of contaminants that contain hazardous matter including those containing Cl, F, P, S Examples of hazardous pesticides that may be removed by the method disclosed herein, include, without being limited thereto, dichlorvos, diazinon, chlorpyrifos, boscalid, cyprodinil, fludioxnonil, (together known as switch), methoxyfenozide, prochloraz and (sportex) lambda-cyhalothrin.

Notably, the contaminant may e at the surface of the plant part, but also, at times, deeper in the plant part, e.g. in sub-surfaces.

Thus, in accordance with some examples, the cleaning effect of the method disclosed herein is used to at least clean plants and plant parts from surface contaminants. In some embodiments, the treatment is for removing chemical and biological residual substances, e.g. pesticidal material deposited on the skin of the plant part, such as the skin of a fruit or vegetable.

As noted above, the object may be other than a plant part. In some examples, the object is an inorganic object. In some examples, the object is composed of or at least comprises a metal or metal alloy outer surface.

In some examples, the metal is selected from the group consisting of aluminum, gold, platinum, rhodium, silver and any combinations of same.

In some examples, the metal alloy is selected from the group consisting of stainless steel and a metal matrix composite.

In some examples, the object is composed of or comprises a semiconductor. In some examples, the semiconductor is or comprises a material selected from the group consisting of silicon, germanium and gallium.

At times, it is desired to merely smoothen the surfaces of inorganic object, e.g. in accordance with the smoothening aspect. Alternatively or in addition, it is desired to remove contaminants (such as those mentioned above) from the surface of the object, such as metal and metal alloy, e.g. in accordance with the cleaning aspect.

Without being limited thereto, the metal or metal alloys may be selected from the group consisting of aluminum, any type of precious metals and alloys thereof, stainless steel, cobalt-based alloys nickel-based alloys, chromium-based alloys, molybdenum-based alloys, tantalum-based alloys, copper-based alloys, titanium-based alloys, magnesium-based alloys, zirconium-based alloys, tungsten-based alloys or combinations thereof.

The precious metals may be selected from the group consisting of gold, platinum, rhodium, silver, iridium and alloys thereof.

When the object at least comprises a metal, metal alloy or semiconductor at its surface, the method is applied to at least remove solid matter/contaminants from the surface of the object.

Performing the method disclosed herein provides a polish effect on the surface on said object. When the object is of an inorganic material, such as a metal, metal alloy or semiconductor, the method shines or provides a shining effect onto the surface of the object.

It was surprisingly found that operating the ultrasonic bath with the nanoparticles was effective in removing solid matter which could not have been removed or was removed to a lower extent (less efficiently) in the absence of the nanoparticles. In a non-limiting example described herein, effective treatment was exhibited on the surface of stainless steel candle holder, which led to a polishing effect on the surface of the candle holder.

Further, it was surprisingly found that operating the ultrasonic bath with the nanoparticles significantly reduced the time required in order to remove an amount of solid matter, as compared to the time required in the absence of the nanoparticles.

SOME NON-LIMITING EXAMPLES

Example 1: Treatment of Contaminated Seeds with Ultrasound Bath Containing Nano-Sized Alumina Powder of 50 nm Size Particles To determine effectiveness of the method disclosed herein on the removal of contaminants from seeds, without damaging of the seeds, two sources of contaminated seeds were tested—spinach seeds and corn salad seeds, with the aim of preserving germination level and pathogen reduction located on the outer skin of the seeds.

Pathogen Reduction

Two hatches of each source of the contaminated seeds were treated (namely, two batches of spinach seeds and two batches of corn salad seeds). The first batch of each seeds source was treated in fresh water and the second batch was treated in an ultrasound water bath of 100 liter, using a machine by Ultra Sonic Power Corporation of USA containing nano-sized alumina powder (diameter 50 nm at a concentration of 0.01% w/v). The baths were operated at two different temperatures according to Table 1 below.

After the treatment processes, the seed lots were dried to a suitable level required for healthy storage of the seeds.

TABLE 1

Operating parameters of the ultrasound treating bath with nanoparticles according to the method described herein and water cleaning bath

| Parameters | Ultrasound with nanoparticles treatment | Water treatment |
|---|---|---|
| Frequency [kHz] | 40 | X |
| Acoustic power density (APD) [W/L] | 20 | X |
| Temperature [° C.] | 50 | 50 |
|  | 20 | 20 |
| Duration [min] | 30 | 30 |

Contaminated Spinach Seeds

Spinach seeds were infected with target pathogen *Verticillium* spp. The infected spinach seeds developed typical *Verticillium* symptoms including a well developed mycelium web on the outer skin of the seeds.

Hot Temperature Treatment of Contaminated Spinach Seeds

A first batch of the infected seeds was placed in an ultrasound treating bath 100 liter bath volume, made by UPC of USA comprising water and nano-sized alumina powder (diameter 50 nm at a concentration of about 0.01% w/v Also, a second batch of the infected spinach seeds was soaked in a regular hot water bath (no ultrasound applied). The temperature of both baths was 50° C.

After 30 minutes in the baths, both the treatment of the batch of seeds in the ultrasound bath containing the nano-sized powder and the treatment of the batch of seeds in the regular hot water bath (no ultrasound applied) resulted in eradication of the *Verticillium* spp.

Cold Temperature (20° C.) Treatment of Contaminated Spinach Seeds

A first batch of the infected seeds was placed in a cold ultrasound treating bath of 100 liter bath volume, comprising water and nano-sized alumina powder (diameter 50 nm at a concentration of about 0.01% w/v. Also, a second batch of the infected spinach seeds was soaked in a regular cold water bath (no ultrasound applied) for comparison. The temperature of both baths was 20° C.

After 30 minutes of treating the first batch of seeds in the cold ultrasound treating bath containing nano-sized alumina powder, the *Verticillium* spp presence decreased from 7.5% infection presence in the as is seeds to 2% (by counting colonies forming units in a petri dish). As a result, the fungal spores eradicated and a significant part of the seed borne pathogens at the outer skin undulated seeds as well.

In comparison, after 30 minutes of soaking the second batch of seeds in the regular cold water bath (no ultrasound applied), the *Verticillium* spp presence increased from 7.5% to 21% by counting colonies forming units in a petri dish, resulting from the spreading of the *Verticillium* spp in the aqueous environment.

Contaminated Corn Salad Seeds

Corn salad seeds were infected with target pathogen *Phoma* fungus. Emerging seedlings show symptoms (black leaf spots, black stem and root) and finally collapse, also developing fruiting structures (pycnidiae) which are typical for *Phoma* can be observed on the seeds.

Germination Reduction

Samples of spinach & corn salad seeds taken from treated samples have been also tested for their germination capability.

Except of a slight priming effect, germination figures did not significantly differ after low temperature treatments compared to the as is lot. At higher temperatures and longer exposure time, germination energy severely decreased for the non-ultra sonic experiment.

The environment has been, according to standardized ISTA rules

Spinach germination—Pleated Papers at 15° C. (PP)
Corn Salad Germination—Top of Papers 15° C. (TP)

The sample treated with ultrasound and nano-powder at low temperature did not exhibit a negative side effect resulting from of the ultrasonic treatments whatsoever.

Example 2: Treatment of Contaminated Seeds with Ultrasound Bath without Nano-Sized Alumina Powder of 50 nm Size Particles To further determine effectiveness of the method disclosed herein on the removal of contaminants from seeds, the contaminated seeds described in Example 1 are tested in an ultrasound treating bath with nanoparticles according to the method described herein, and for comparison, in a pristine ultrasound bath without addition of nanoparticles. The germination rate and pathogen reduction located on the outer skin of the seeds is tested after treatment of the seeds in both baths.

A first batch of the seeds source of Example 1 is treated in an ultrasound water bath and a second batch is treated in an ultrasound water bath containing nano-sized alumina powder diameter 50 nm at a concentration of 0.01% w/v. The baths are operated at two different temperatures according to Table 2 below.

After the treatment processes, the seed lots are dried to a suitable level required for healthy storage of the seeds.

TABLE 2

Operating parameters of the ultrasound treating bath with nanoparticles according to Example 2 and of ultrasound bath without nanoparticles

| Parameters | Ultrasound with nanoparticles treatment | Ultrasound without nanoparticles |
|---|---|---|
| Frequency [kHz] | 40 | 40 |
| Acoustic power density (APD) [W/L] | 20 | 20 |
| Temperature [° C.] | 50 | 50 |
|  | 20 | 20 |
| Duration [min] | 30 | 30 |

After treating the first batch of seeds in the ultrasound treating bath containing nano-sized alumina powder, the pathogen presence decreases, as a result of the eradication of the fungal spores and a significant part of the seed borne pathogens at the outer skin of the undulated seeds as well. However, the treating of the second bath of seeds in the aqueous ultrasound bath without the addition of nanoparticles is not as effective for reducing the pathogen presence from the seeds and for accelerating the germination rate.

Example 3: Treatment of Tomato with Ultrasound Bath Containing Nano-Sized Diamond Powder To determine effectiveness of the method disclosed herein on the removal of contaminants from tomato fruits, without damaging the fruit itself, two tomatoes were coated with a yellow fluorescence material used as the contaminating matter. The fluorescence material is made out of flakes of about 5 μm in size that are applied to the surface by dipping in an aqueous solution. Each tomato fruit was then placed in an ultrasound cleaner (9 liter bath volume, MRC make Israel), the first in a fresh-water bath, and the second in a water bath containing pure nano-sized diamond powder (diameter 50 nm) at a concentration of about 0.004% w/v.

The ultrasonic cleaners were operated using the following parameters:
Frequency of 40 kHz;
Acoustic power density (APD) of 20 W/L;
Temperature 30° C.

During operation of the ultrasonic cleaners, the tomato fruit were observed using a blue LED light. After the 6 minutes in the baths, the tomato in the bath containing the nano-sized diamond powder lost the yellowish fluorescent coating which means the removal of the coating. The treatment continues until the other tomato lost its yellowish fluorescent coating, after an additional 6.5 minutes, i.e. after 12.5 minutes.

Figure 1A:
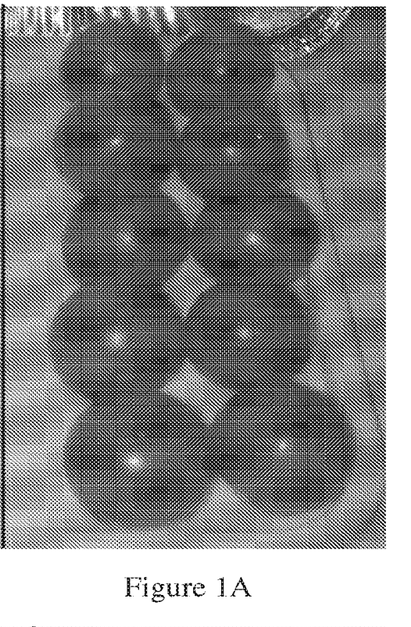
FIGS. 1A-1B is an image of cherry tomato samples after treatment in an ultrasonic bath, with (FIG. 1A) and without (FIG. 1B) the nano-size diamond powder present in the bath's aqueous medium, both for the same duration of action.
Figure 1B:
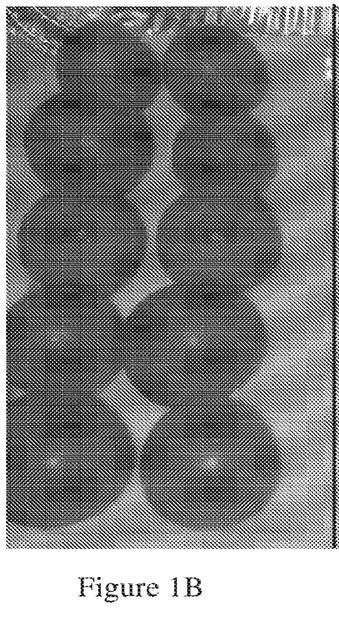

Images of tomatoes after ultrasound cleaning with (FIG. 1A) and without (FIG. 1B) nano-sized diamond powder. As shown (FIG. 1A), the surface of the nanoparticles treated tomatoes is shinier and highly reflective, indicating the removal of contaminants from the surface.

Example 4: Treatment of Stainless Steel Candle Holders with Ultrasound Bath Containing Nano-Sized Alumina Powder Two stainless steel candle holders were placed in the ultrasound cleaner (9 liter bath volume, MRC make Israel), the first in a fresh-water bath, and the second in a water bath containing nano-alumina ($Al_2O_3$) powder (particle size 50 nm, Sky Spring Nanomaterials, Inc.) at a concentration of about 0.004% w/v.

The ultrasonic cleaners were operated using the following parameters:
Frequency of 40 kHz;
Acoustic power density (APD) of 20 W/L;
Temperature 30° C.

Figure 2A:
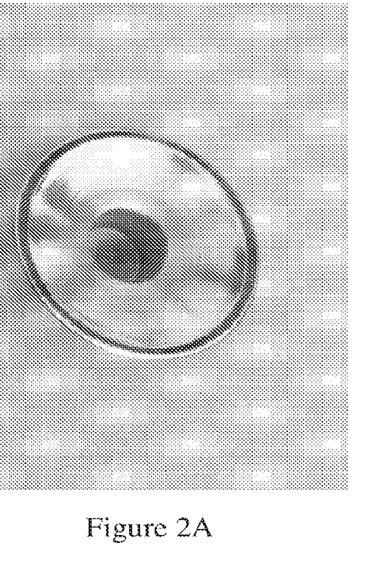
FIGS. 2A-2B are images of stainless steel candle holders after treatment in an ultrasonic bath with (FIG. 2A) and without (FIG. 2B) nano-size alumina particles present in the bath's aqueous medium.
Figure 2B:
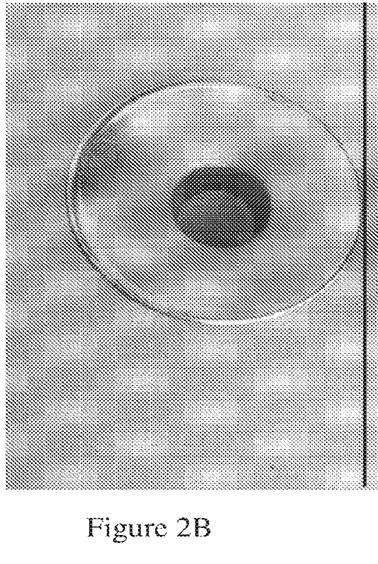

The ultrasound bath was treated for 300 minutes. An image of the two candle holders (holder A and holder B) with and without nano-alumina powder in the ultrasound cleaning bath is presented, respectively, in FIG. 2A (holder A) and FIG. 2B (holder B). It is noticed from this image that the treatment with nano-alumina powder caused a polishing effect over a larger area (FIG. 2A) compared to the non-nanoparticles treated object, indicative of a larger degree of removal of matter from the holder's surface that was not feasible without nanoparticles (FIG. 2B).

Example 5: Treatment of Aluminum Foil with Ultrasound Bath Containing Nano-Sized Diamond Powder Sheets of aluminum foil were treated in ultrasonic cleaners, one with water only and the other with nano-diamond powder (50 nm) at a concentration of 0.004% w/v. The ultrasonic cleaners were operated as described in Example 3.

Figure 3A:
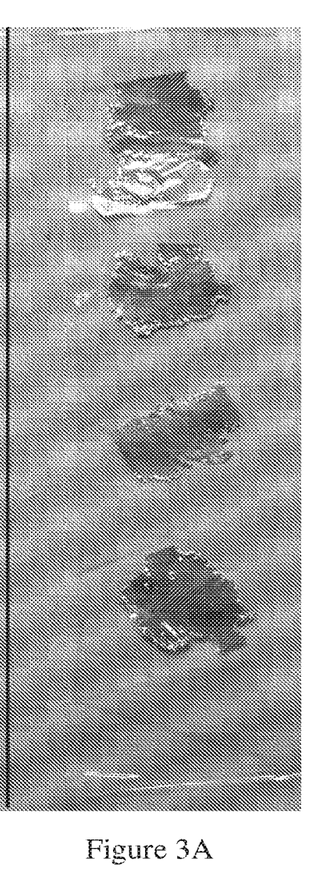
FIGS. 3A-3B are images of aluminum foil samples after treatment in an ultrasonic bath, with (FIG. 3A) and without (FIG. 3B) nano-size diamond powder present in the bath's aqueous medium.
Figure 3B:
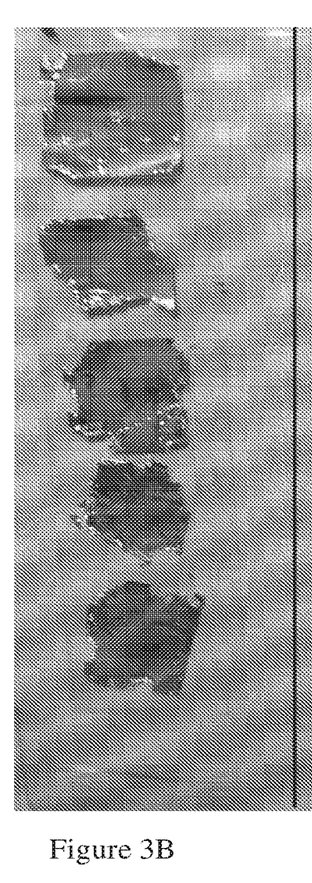

The results of treatment with nanoparticles and without nanoparticles are shown in FIG. 3. (column A and B, respectively). FIG. 3A shows that the treatment of the foils in the nanoparticles-treated experiment was more pronounced as compared to the treatment without the nanoparticles as shown in FIG. 3B. The pieces of aluminum foil samples were etched at the edges of the samples more prominently for the samples of nanoparticles-treated solution.

Example 6: Treatment of Aluminum Foil with Ultrasound Bath Containing Nano-Sized Particles Powder Two sheets of aluminum foil were treated in ultrasonic cleaners, one with water only and the other with nano-alumina powder (50 nm at a concentration of 0.01% w/v). The ultrasonic cleaners were operated as described in Table 3.

TABLE 3

Operating parameters of the ultrasound cleaning bath with nanoparticles according to Example 6 and of ultrasound bath without nanoparticles

| Parameters | Ultrasound with nanoparticles cleaning | Ultrasound without nanoparticles |
| --- | --- | --- |
| Frequency [kHz] | 40 | 40 |
| Acoustic power density (APD) [W/L] | 20 | 20 |
| Temperature [° C.] | 12 | 12 |
| Duration [sec] | 20 | 20 |

Figure 4A:
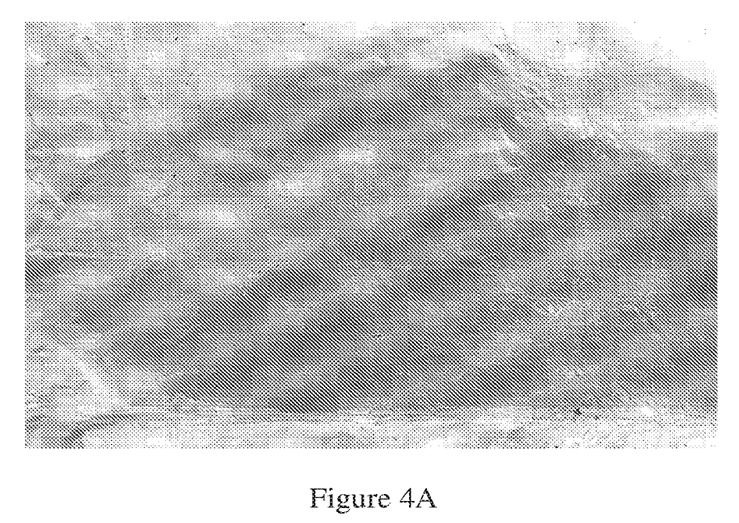
FIGS. 4A-4B are images of aluminum foil samples after treatment in an ultrasonic bath, without addition of nano-sized alumina particles (FIG. 4A) and with (FIG. 4B) the nano-sized alumina particles.
Figure 4B:
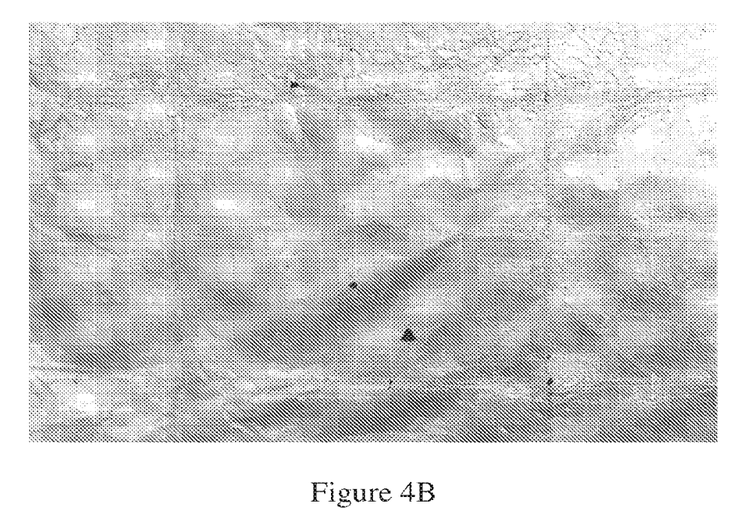

The results of treatment without (FIG. 4A) and with (FIG. 4B) nanoparticles. FIG. 4B shows that the amount of perforations of the aluminum foil treated in the nanoparticles experiment is greater as compared to the treatment without the nanoparticles (FIG. 4A), while the size of the perforations exhibited in FIG. 4B is much smaller than the perforations exhibited in FIG. 4A.

What is claimed is:

1. A method for reducing level of contaminants from objects carrying contaminants, the method comprising:
   introducing the objects into an ultrasonic (US) bath carrying a liquid medium holding suspended therein water insoluble nanoparticles, wherein said objects are plant parts; and
   activating said bath to cause US waves in said liquid medium while the objects are at least partially submerged within said liquid medium;
   wherein said bath is activated at a frequency of at most 150 kHz, said frequency being sufficient to cause movement of the water insoluble nanoparticles within said liquid medium and thereby removal of said contaminants from the objects;
   wherein said nanoparticles comprise at least one of a metal oxide and a silicon oxide at a determined density, wherein said objects are plant parts;
   said nanoparticles in the US bath are at a concentration of between 0.0001% w/v to 1.0% w/v; and
   said nanoparticles have an average diameter in a range of 30 nm to 80 nm.

2. The method of claim 1, further comprising activating the ultrasonic bath for a time sufficient to reduce the level of contaminants from the objects as compared to the level thereof before said application of the US waves.

3. The method of claim 1, wherein the water insoluble nanoparticles comprise metal oxide nanoparticles.

4. The method of claim 1, wherein the nanoparticles are characterized by a hardness in a range of 7 to 11 according to the Mohs scale or by a hardness in a range of 700 to 1100 according to the Vickers scale.

5. The method of claim 1, comprising activating the US bath at a frequency range of between 20 kHz to 150 kHz.

6. The method of claim 1, comprising activating the ultrasonic bath at a frequency range of between 10 kHz to 90 kHz.

7. The method of claim 1, comprising activating the US bath at an acoustic power density in a range of 15 W/liter 150 W/liter.

8. The method of claim 1, comprising activating the US bath at an acoustic power density in a range of 10 Watt/liter to 120 Watt/liter.

9. The method of claim 1, wherein said activating of the US bath is for a time period of from 1 min to 60 min.

10. The method of claim 1, wherein said method provides a plant part having a maximum residue level (MRL) of contaminants of less than 20% from the MRL acceptable for said plant part under Regulation 396/2005 of EU legislation on MRLs.

11. The method of claim 1, wherein said contaminant comprises at least one pathogen.

12. The method of claim 1, wherein the plant parts comprise seeds.

13. The method of claim 1, wherein the nanoparticles in the US bath are at a concentration of between 0.0001% w/v to 0.1% w/v.

14. The method of claim 2, wherein said level of contaminants is reduced by at least 50% w, as compared to the level thereof before said application of the US waves.

15. The method of claim 3, wherein the water insoluble nanoparticles are metal oxide nanoparticles selected from the group consisting of aluminum oxide nanoparticles, zirconium oxide nanoparticles, titanium oxide nanoparticles, cerium oxide nanoparticles and mixtures thereof.

* * * * *